(12) United States Patent
Schoneboom

(10) Patent No.: US 10,668,804 B2
(45) Date of Patent: Jun. 2, 2020

(54) DAMPENER FOR ISOLATED VIBRATION ISSUES

(71) Applicant: DENSO International America, Inc., Southfield, MI (US)

(72) Inventor: Sean Paul Wade Schoneboom, Livonia, MI (US)

(73) Assignee: DENSO INTERNATIONAL AMERICA, INC., Southfield, MI (US)

( * ) Notice: Subject to any disclaimer, the term of this patent is extended or adjusted under 35 U.S.C. 154(b) by 90 days.

(21) Appl. No.: 16/023,108

(22) Filed: Jun. 29, 2018

(65) Prior Publication Data

US 2020/0001701 A1    Jan. 2, 2020

(51) Int. Cl.
| | | |
|---|---|---|
| F16F 1/46 | (2006.01) | |
| F16F 1/373 | (2006.01) | |
| B60K 11/04 | (2006.01) | |
| B62D 25/08 | (2006.01) | |
| F28F 9/00 | (2006.01) | |
| B23K 1/00 | (2006.01) | |
| F28F 9/26 | (2006.01) | |
| B23K 37/04 | (2006.01) | |
| F28F 1/10 | (2006.01) | |

(52) U.S. Cl.
CPC ............ B60K 11/04 (2013.01); B62D 25/084 (2013.01); F16F 1/373 (2013.01); F16F 1/46 (2013.01); *B23K 1/0012* (2013.01); *F16F 2224/025* (2013.01); *F16F 2226/04* (2013.01); *F16F 2228/08* (2013.01); *F16F 2236/06* (2013.01); *F28F 1/10* (2013.01); *F28F 9/001* (2013.01); *F28F 2240/00* (2013.01)

(58) Field of Classification Search
CPC ....... B60K 11/04; B62D 25/084; F16F 1/373; F16F 1/46; F16F 2224/025; F16F 2226/04; F16F 2228/08; F16F 2236/06; F28F 9/001; F28F 1/10; F28F 2240/00; F28F 1/126
See application file for complete search history.

(56) References Cited

U.S. PATENT DOCUMENTS

| | | | | |
|---|---|---|---|---|
| 2,961,222 A | * | 11/1960 | Butt ..................... | F28D 9/0037 165/166 |
| 4,053,969 A | * | 10/1977 | Bayard .................. | B21D 53/04 29/890.039 |
| 5,004,045 A | * | 4/1991 | Le Gauyer ........... | B23K 1/0012 165/149 |

(Continued)

FOREIGN PATENT DOCUMENTS

| | | |
|---|---|---|
| JP | 2001147094 A | 5/2001 |
| JP | 2015113985 A | 6/2015 |

*Primary Examiner* — Tan Le
(74) *Attorney, Agent, or Firm* — Brooks Kushman P.C.

(57) ABSTRACT

A system for dampening vibrations in a vehicle is provided. The system includes a first heat exchanger core having a first plurality of fins, and a second heat exchanger core having a second plurality of fins. A vibration dampener is connected to the first and second heat exchanger cores. The vibration dampener extends through the first plurality of fins and through the second plurality of fins, while spanning the gap between the first and second heat exchanger cores. To accommodate the vibration dampener passing thorough the fins, the fins may be formed to define an enlarged aperture at a location where the vibration dampener passes through.

19 Claims, 5 Drawing Sheets

(56) References Cited

U.S. PATENT DOCUMENTS 5,960,864 A * 10/1999 Morita ................ B23K 1/0012
                                                    165/173
7,506,681 B2 * 3/2009 Lesage ................ B21D 53/085
                                                    165/69

* cited by examiner

DAMPENER FOR ISOLATED VIBRATION ISSUES

TECHNICAL FIELD

The present disclosure relates to a dampener for dampening vibrations in and around a heat exchanger of a vehicle.

BACKGROUND

Automotive vehicles can be equipped with several heat exchangers. For example, vehicles equipped with an internal combustion engine typically include a radiator. Radiators are heat exchangers used for cooling the engine by removing heat from engine coolant that circulates around the engine block. A series of small tubes and fins may be used to remove the heat efficiently.

Condensers are another type of heat exchangers in vehicles. Vehicles equipped with a heating, ventilation and air conditioning (HVAC) system typically include a condenser for removing heat from the refrigerant circulated through the HVAC system. Also like radiators, the condensers may include a series of small tubes and fins to efficiently remove the heat from the refrigerant.

Noise, vibration and harshness (NVH) should be taken into account when designing and implementing various components into the vehicle. Heat exchangers such as radiators and condensers are no exception.

SUMMARY

According to one embodiment, a system for dampening vibration in a vehicle is provided. The system includes a first heat exchanger core, and a second heat exchanger core spaced from the first heat exchanger core, defining a gap between the two heat exchanger cores. A vibration dampener is configured to dampen vibration in at least one of the heat exchanger cores. The vibration dampener is: (i) mounted to the first heat exchanger core, (ii) mounted to the second heat exchanger core, and (iii) extending through the first and second heat exchanger cores and spanning the gap therebetween.

In another embodiment, a vibration-dampening system for a vehicle includes a first heat exchanger core having a first plurality of fins. At least two of the first plurality of fins cooperate to define a first aperture. A second heat exchanger core is spaced from the first heat exchanger core and have a second plurality of fins, wherein at least two of the second plurality of fins cooperate to define a second aperture. A vibration dampener is configured to dampen vibrations in at least one of the heat exchanger cores. The vibration dampener is fixed to the first and second heat exchanger cores and passing through the first and second aperture.

In yet another embodiment, a system for dampening vibrations in a vehicle includes a first heat exchanger core having a first plurality of fins, and a second heat exchanger core having a second plurality of fins. A vibration dampener is connected to the first and second heat exchanger cores. The vibration dampener extends through the first plurality of fins and through the second plurality of fins.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Having vibration issues in the development of a product can sometimes lead to a full redesign of that product. To prevent a full redesign, supplemental components can be implemented to reduce or eliminate the vibration issues. For example, to address NVH issues with heat exchangers such as radiators and condensers, external brackets may be used to mount the heat exchanger to another fixed component. Due to the relatively small size of the openings between fins of heat exchangers, the brackets may be located on the outer perimeter (e.g., corners) of the heat exchanger.

Condensers and radiators may be aligned one in front of the other, spaced apart by only a few inches or less. This also creates difficulty in addressing NVH issues that may concern interior portions of the heat exchangers. The present disclosure provides a vibration dampener to reduce or eliminate potential NVH concerns (e.g., vibration) in heat exchangers such as condensers and radiators.

Therefore, according to various embodiments disclosure herein, a vibration dampener is connected to at least one heat exchanger by passing through the fins of that heat exchanger. As will be described below, in varying embodiments the vibration dampener may be an elongate rubber structure held in tension between two heat exchangers (e.g., condenser and radiator), passing through the fins of those heat exchangers, and mounted to the external faces of the heat exchangers with anchors.

Figure 1:
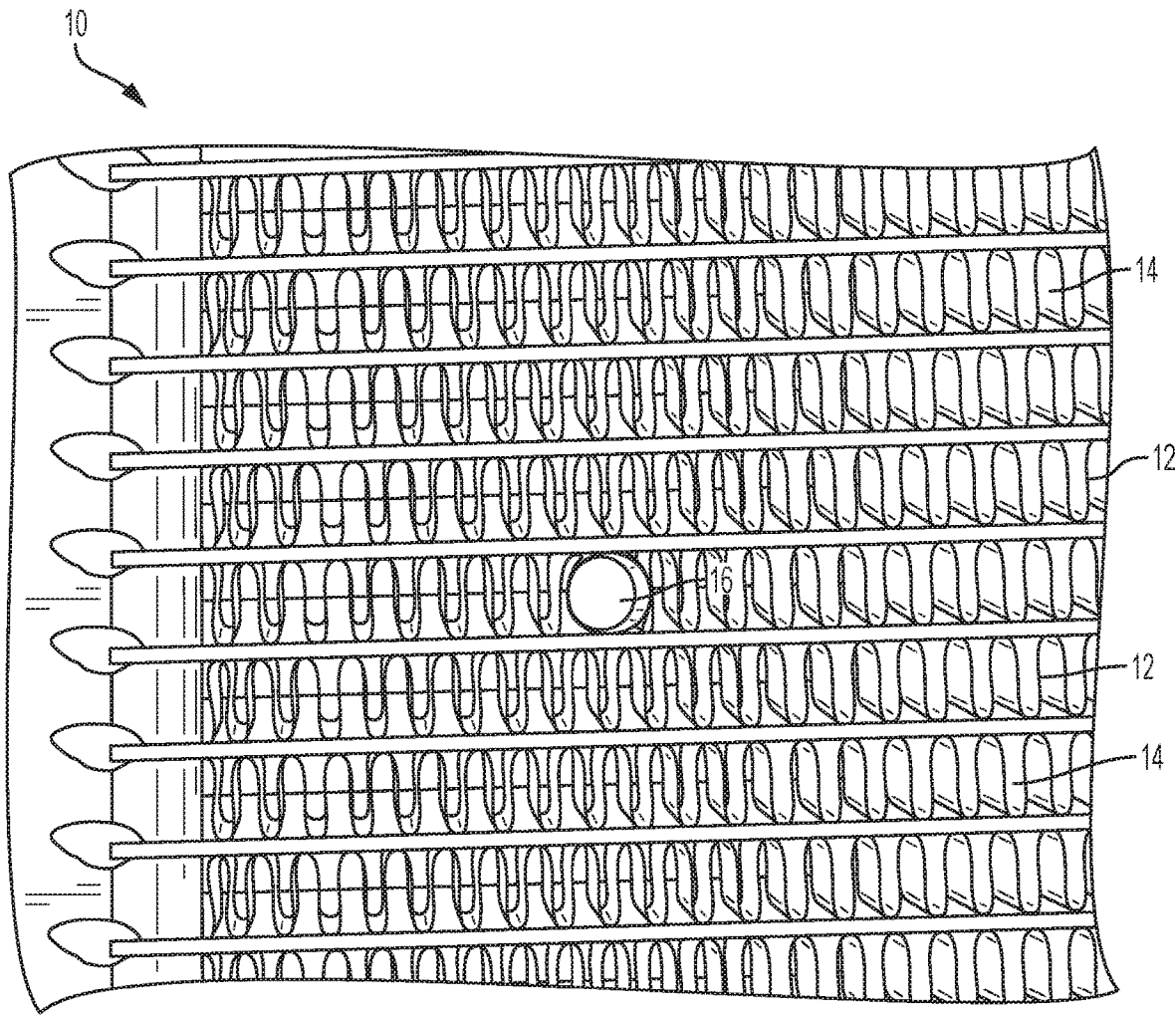
FIG. 1 is a front view of a heat exchanger (such as a condenser or radiator) having an enlarged aperture formed therethrough, according to one embodiment.

FIG. 1 shows a front view of a first heat exchanger 10. The first heat exchanger may be a condenser, a radiator, or the like having a core with a plurality of fins 12 configured to remove and dissipate heat from fluid such as engine coolant, HVAC refrigerant, etc. While the fins 12 are shown arranged in a wave pattern, the fins can also be arranged in a honeycomb pattern, a grid pattern, or the like. Between adjacent fins 12 are a plurality of openings 14 extending through the heat exchanger 10 for air to pass through while removing heat from the fins.

At least two of the fins 12 are formed to define an enlarged aperture 16. The enlarged aperture may be larger than any of the openings 14 existing between the remaining fins. The enlarged aperture may also be a different shape (e.g., rounded or cylindrical) than the openings 14 existing between the remaining fins. The enlarged aperture 16 may be drilled into the already-formed fins, or may be formed into the fins during manufacturing. As will be described further below, the enlarged size and rounded shape of the aperture allow for a vibration dampener and/or an associated isolator to be passed therethrough to isolate and dampen vibrations that might occur in at least one of the heat exchangers.

Figure 2:
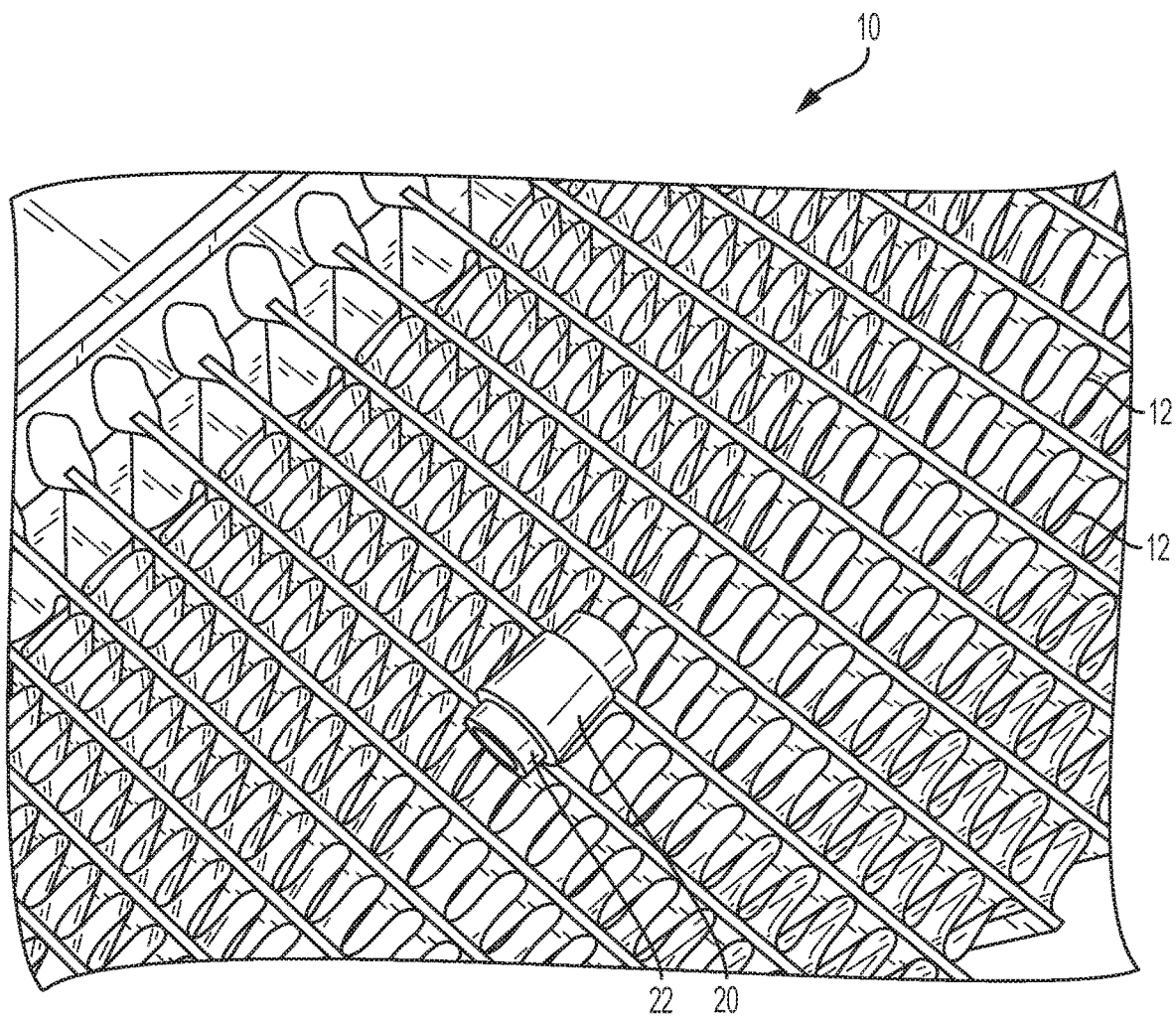
FIG. 2 is a front perspective view of the heat exchanger with a vibration dampener attached thereto and passing through the enlarged aperture, according to one embodiment.

FIG. 2 shows a perspective view of the first heat exchanger 10 with a vibration dampener 20 attached thereto. In particular, the vibration dampener 20 extends through the enlarged aperture 16. In another embodiment, the vibration dampener extends through one of the openings 14 between two adjacent fins 12. As shown in FIG. 2, the vibration dampener includes an anchor 22 at one end. The anchor 22 is larger than the opening 14 or 16 through which the main body of the vibration dampener extends through. This allows the anchor 22 to rest across the fins 12 of the first heat exchanger 10. In other words, the edges of the fins 12 collectively define a face of the core of the heat exchanger 10, and the anchor 22 rests along the face to secure the vibration dampener thereto.

While not shown in FIG. 2, the vibration dampener 20 extends through the first heat exchanger 10 and toward a second heat exchanger. The vibration dampener 20 extends through the second heat exchanger, and may include another anchor at that end of the vibration dampener to rest along a face of the second heat exchanger, similar to the anchor 22.

Figure 3:
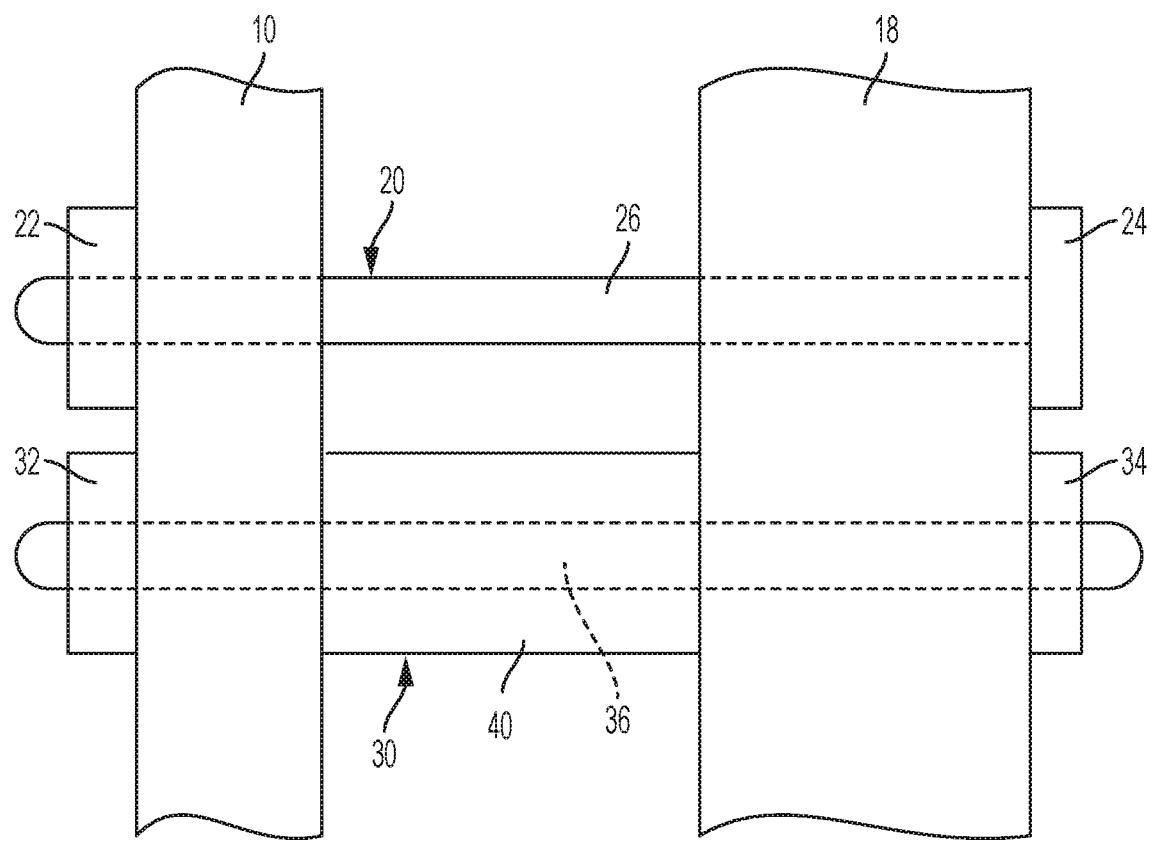
FIG. 3 is a side cross-sectional view of two heat exchangers with two different examples of vibration dampeners extending therethrough and connected with each heat exchanger, according to one embodiment.

FIG. 3 shows such an arrangement according to an embodiment. In FIG. 3, two separate vibration dampeners, namely the first vibration dampener 20 and a second vibration dampener 30. The first vibration dampener 20 includes a first anchor 22 at one end, and a second anchor 24 at the other end. Similarly, the second vibration dampener 30 includes a first anchor 32 at one end, and a second anchor 34 at the other end of the vibration dampener 30. The first anchors 22, 32 mount their respective vibration dampener 20, 30 to the first heat exchanger 10, while the second anchors 24, 34 mount their respective vibration dampener 20, 30 to a second heat exchanger 18. In other words, each vibration dampener is mounted to both heat exchangers via respective mounts. And, as explained with reference to FIGS. 1-2 above, the vibration dampeners 20, 30 can extend through respective openings or apertures in the heat exchangers 10, 18, while the anchors 22, 24, 32, 34 can rest along outward-facing faces of the heat exchangers 10, 18.

The vibration dampeners 20, 30 may have several variations of anchors. For example, the first anchor 22 of the first vibration dampener 20 may be a peg that serves as an attachment point for a main body 26 of the vibration dampener 20. In this configuration, the main body 26 may by a split-body or a continuous body (such as a rubber band) that wraps around the peg 22. Such a configuration is shown in FIG. 2. Alternatively, the anchor and main body may be integrally molded as a single component. Such a configuration is shown in FIG. 3, where the second anchor 24 is integrally formed with the main body 26. In other embodiments, different combinations of these types of anchors or other types may be used.

In several embodiments, the anchors may be made of plastic while the main body is made of rubber. In other embodiment, both the main body and the anchor is made of the same material, such as rubber or plastic. The anchors can be configured to sufficiently hold the main body of the vibration dampener against the heat exchanger.

The anchors are configured to hold the vibration dampeners in tension. For example, the first anchor 22 and the second anchor 24 hold the vibration dampener 20 in tension between the first and second heat exchanger cores 10, 18. To do so, in one embodiment the vibration dampeners are stretched during assembly. For example, the vibration dampener 20 may be inserted through an opening 14 or enlarged aperture 16 of the first heat exchanger 10. The vibration dampener 20 may then be stretched toward the second heat exchanger 18, and inserted through a corresponding opening or aperture of the second heat exchanger 18. The second anchor 24 then holds the vibration dampener 20 in a stretched state (e.g., in tension) between the two heat exchangers. Maintaining the vibration dampener 20 in tension can help the effectiveness of the vibration dampener in dampening vibrations that might occur in or around at least one of the heat exchangers.

At least one of the vibration dampeners can also include an isolator 40. The isolator 40 may be cylindrical, and may contact the inner faces of both heat exchanger cores 10, 18. The isolator may also be of a different material than the remainder of the vibration dampener 30. For example, the isolator 40 may be made of plastic while the main body 36 of the vibration dampener 30 is made of rubber. The isolator 40 may be separately connected to the main body, having an aperture passing through the isolator 40 that is sized and configured to receive the main body of the vibration dampener 30, as shown in FIG. 3. Alternatively, the main body and the isolator 40 may be formed of the same material and/or integrally formed as a single component.

The isolator 40 can also have a larger outer diameter than the remainder of the vibration isolator 30. And, by contacting the inner facing faces of the heat exchanger cores 10, 18, the isolator is configured to isolate and further dampen vibrations between or in at least one of the heat exchanger cores 10, 18.

Figure 4A:
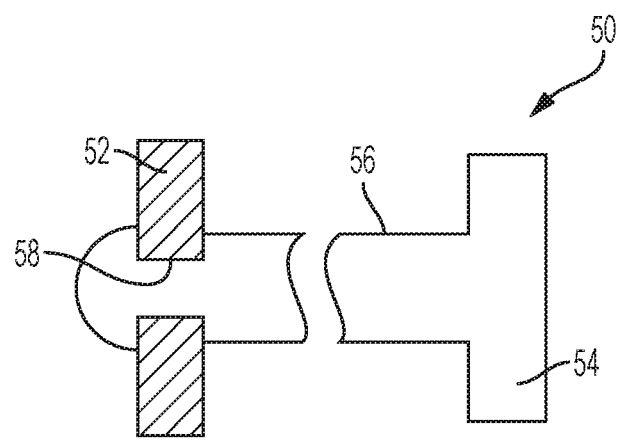
FIG. 4A is a segmented side cross-sectional view of a vibration dampener according to one embodiment.
Figure 4B:
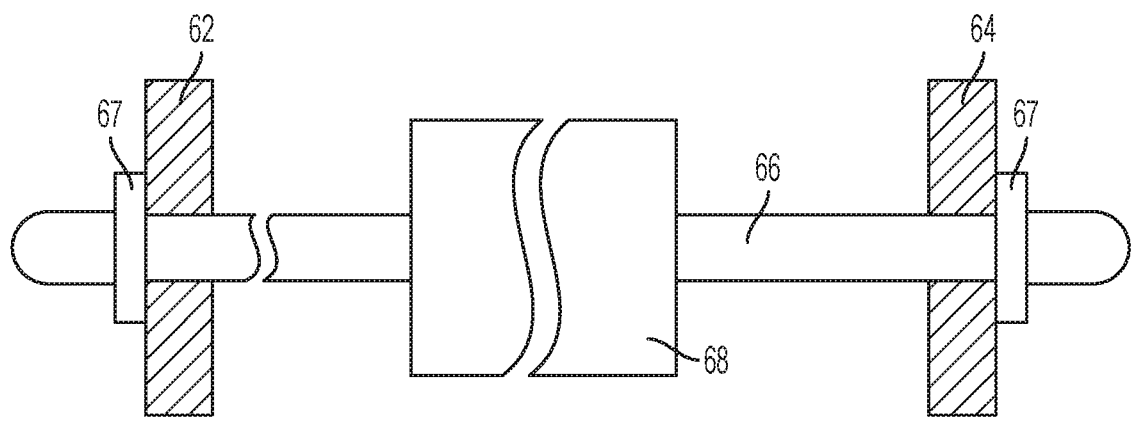
FIG. 4B is a segmented side cross-sectional view of a vibration dampener according to another embodiment.

FIGS. 4A and 4B show two different embodiments of vibration dampeners, similar to those explained above. For example, FIG. 4A shows a vibration dampener 50 that does not have an isolator. The vibration dampener has a first anchor 52 at one end, and a second anchor 54 at the other end, similar to those described above. In this embodiment, the first anchor 52 is a washer formed with or attached to the main body 56 of the vibration dampener 50. The washer is metal, but may also be rubber or plastic. The main body 56 may include an annular notch or groove 58 to fit and accommodate the washer. The main body 56 may be rubber. The second anchor 54 is an integrally-formed cylindrical member formed along with the main body 56, and made of rubber.

FIG. 4B shows another embodiment in which a vibration dampener 60 includes a first anchor 62 which is a washer, and a second anchor 64 that is also a washer. At each end of the main body 66 of the vibration dampener is an annular protrusion 67 that covers a corresponding outer surface of that washer to hold the washer against the outer face of the heat exchanger core 10, 18. An isolator 68 is also included in this embodiment, and can be sized according to the dimensions of the space between the heat exchanger cores 10, 18.

Figure 5:
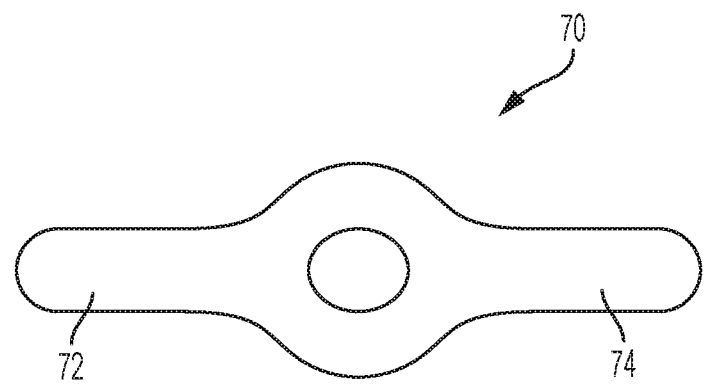
FIG. 5 is a front end view of an anchor of one of the vibration dampeners, according to one embodiment.

FIG. 5 shows a front end view of one of one of the vibration dampeners disclosed herein. This view shows an embodiment of a shape of an anchor. In particular the anchor 70 is not entirely cylindrical; instead, the anchor has a pair of legs 72, 74 that extend radially outwardly from a center of the anchor 70. These legs 72, 74 make the anchor 70 oblong in shape. The legs 72, 74 can extend over two or more fins of the corresponding heat exchanger core to which it is attached. The anchor 70 may be made of rubber. As such, the rubber shape of the anchor along with its outwardly-extending legs 72, 74 provide the anchor 70 with flexibility for assembly. In particular, the legs 72, 74 can be bent or flexed to fit through an opening 14 or aperture 16 of the heat exchanger, and then returned to their original shape once fitted through the opening or aperture. Once returned to their original shape as shown in FIG. 5, the legs 72, 74 can rest on the outer face of the heat exchanger to hold the vibration dampener in tension between the two heat exchangers.

Various embodiments of vibration dampeners, anchors, isolators, etc. are disclosed herein. It should be understood that the present disclosure is intended to cover the vibration dampeners disclosed herein and also other vibration dampeners using different combinations of the anchors, isolators, etc.

The vibration dampeners of the present disclosure can reduce vibration in or between heat exchangers (e.g., radiators and condensers) of a vehicle. This can reduce or eliminate the need for vibration-dampening brackets on the perimeter of the heat exchanger. Instead, the vibration dampeners save on packaging space, taking advantage of the gap between two heat exchangers that is otherwise void.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for dampening vibrations in a vehicle, the system comprising:
   a first heat exchanger core having a first plurality of fins;
   a second heat exchanger core having a second plurality of fins, and spaced from the first heat exchanger core to define a gap therebetween; and
   a vibration dampener configured to dampen vibration in at least one of the heat exchanger cores, the vibration dampener
      (i) mounted to the first heat exchanger core,
      (ii) mounted to the second heat exchanger core, and
      (iii) extending through the first and second plurality of fins and spanning the gap between the cores.

2. The system of claim 1, wherein the vibration dampener is held in tension between the first and second heat exchanger cores.

3. The system of claim 2, wherein the vibration dampener includes a rubber body.

4. The system of claim 1, wherein the at least two of the first plurality of fins are formed to define a first rounded aperture, at the least two of the second plurality of fins are formed to define a second rounded aperture, and the vibration dampener extends through the first and second rounded apertures.

5. The system of claim 1, wherein the vibration dampener includes a first anchor at a first end of the vibration dampener contacting an outer face of the first heat exchanger core, and a second anchor at a second end of the vibration dampener contacting an outer face of the second heat exchanger core.

6. The system of claim 5, wherein the first and second anchors each have a profile that exceeds a size of a space between the first and second plurality of fins that the vibration dampener extends through.

7. The system of claim 1, wherein the vibration dampener includes a first portion that extends through the first heat exchanger core, a second portion that extends through the second heat exchanger core, and a vibration isolator extending through the gap between the first and second heat exchanger cores.

8. The system of claim 7, wherein the vibration isolator has an outer diameter that exceeds an outer diameter of the first portion and an outer diameter of the second portion.

9. A vibration-dampening system for a vehicle, the system comprising:
   a first heat exchanger core having a first plurality of fins, wherein at least two of the first plurality of fins cooperate to define a first aperture;
   a second heat exchanger core spaced from the first heat exchanger core and having a second plurality of fins, wherein at least two of the second plurality of fins cooperate to define a second aperture; and
   a vibration dampener configured to dampen vibrations in at least one of the heat exchanger cores, the vibration dampener fixed to the first and second heat exchanger cores and passing through the first and second aperture.

10. The system of claim 9, wherein the first heat exchanger core includes a first side facing away from the second heat exchanger core, wherein the second heat exchanger core includes a second side facing away from the first heat exchanger core, and wherein the vibration dampener is fixed to the first and second sides.

11. The system of claim 10, wherein the vibration dampener includes a first anchor contacting the first side and passing over the at least two of the first plurality of fins, and a second anchor contacting the second side and passing over at least two of the second plurality of fins.

12. The system of claim 11, wherein the vibration dampener includes a main body extending between the first and second heat exchanger cores, and wherein the first and second anchors hold the main body in tension.

13. The system of claim 9, wherein the vibration dampener includes a vibration isolator extending between and contacting the first and second heat exchanger cores.

14. The system of claim 13, wherein at least one of the first and second apertures is rounded with a diameter equal to or greater than a diameter of the vibration isolator.

15. The system of claim 13, wherein the vibration dampener includes a main body that passes through an aperture in the vibration isolator.

16. The system of claim 15, wherein the main body and the vibration isolator are made of different materials.

17. A system for dampening vibrations in a vehicle, the system comprising:
   a first heat exchanger core having a first plurality of fins;
   a second heat exchanger core having a second plurality of fins; and
   a vibration dampener connected to the first and second heat exchanger cores, the vibration dampener extending through the first plurality of fins and through the second plurality of fins.

18. The system of claim 17, wherein the vibration dampener is held in tension between the first and second heat exchanger cores.

19. The system of claim 17, further comprising a vibration isolator entirely located between and contacting the first and second heat exchanger cores.

* * * * *